United States Patent [19]

Ehritt

[11] Patent Number: 4,789,318

[45] Date of Patent: Dec. 6, 1988

[54] DEVICE FOR MANUFACTURING MOLDED ARTICLES OF PLASTICS MATERIAL

[75] Inventor: Jürgen Ehritt, Hilchenbach-Müsen, Fed. Rep. of Germany

[73] Assignee: Battenfeld GmbH, Meinerzhagen, Fed. Rep. of Germany

[21] Appl. No.: 95,855

[22] Filed: Sep. 10, 1987

[30] Foreign Application Priority Data

Sep. 23, 1986 [DE] Fed. Rep. of Germany ....... 3632185

[51] Int. Cl.$^4$ ...................... B29C 47/06; B29C 47/22
[52] U.S. Cl. .................... 425/130; 425/133.1; 425/462; 425/466; 425/467
[58] Field of Search ............... 425/130, 114, 462, 466, 425/467, 381, 376 R, 376 A, 376 B, 133.1; 264/209.8, 209.2, 177.2

[56] References Cited

U.S. PATENT DOCUMENTS

| | | | |
|---|---|---|---|
| 3,349,435 | 10/1967 | Bosch | 425/466 |
| 3,666,389 | 5/1972 | Nelson | 425/381 X |
| 3,694,123 | 9/1972 | Cook et al. | 425/381 X |
| 3,733,156 | 5/1973 | Garner | 425/130 X |
| 3,894,823 | 7/1975 | Hanning | 425/130 |
| 4,117,955 | 10/1978 | Sokolow | 425/130 X |
| 4,422,838 | 12/1983 | Iwawaki et al. | 425/466 X |
| 4,686,075 | 8/1987 | Dziewanowski et al. | 425/381 X |

FOREIGN PATENT DOCUMENTS

| | | |
|---|---|---|
| 2342789 | 10/1981 | Fed. Rep. of Germany . |
| 8034352 | 6/1982 | Fed. Rep. of Germany . |
| 3247000 | 6/1984 | Fed. Rep. of Germany . |
| 88964 | 8/1974 | Japan ................................ 425/130 |
| 179632 | 10/1983 | Japan ................................ 425/130 |

Primary Examiner—Richard L. Chiesa
Attorney, Agent, or Firm—Toren, McGeady & Associates

[57] ABSTRACT

A device for manufacturing molded articles of plastics material which have an outer skin of a plastics material free of expanding agents and a porous core of a plastics material containing an expanding agent includes an extruder head with a main duct in communication with a discharge opening. Two feed ducts for the two plastics materials lead angularly offset into the main duct at locations axially spaced from the discharge opening and from each other. A closing needle is axially movably placed in the main duct. The two feed ducts can be separated from the main duct by means of the closing needle. The closing needle defines a connecting duct extending essentially in axial direction. The connecting duct ends at the end face of the closing needle and at the circumference of the closing needle radially toward the more remote feed duct. In the closed axial position of the closing needle and in an at least partially open axial position of the closing needle, the radial circumferential opening of the connecting duct is located approximately on the same level as the inner radial outlet opening of the more remote feed duct. The closing needle is rotatable about the longitudinal axis of the extruder head relative to the outlet opening in any axial position of the closing needle.

11 Claims, 7 Drawing Sheets

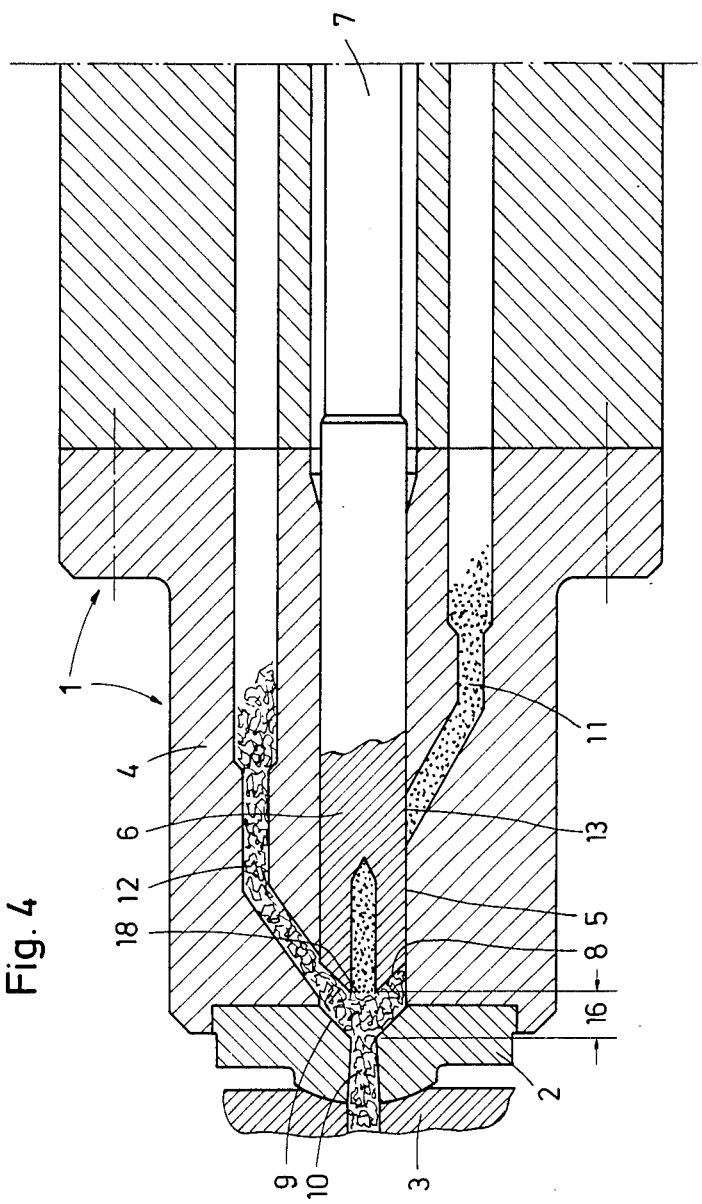

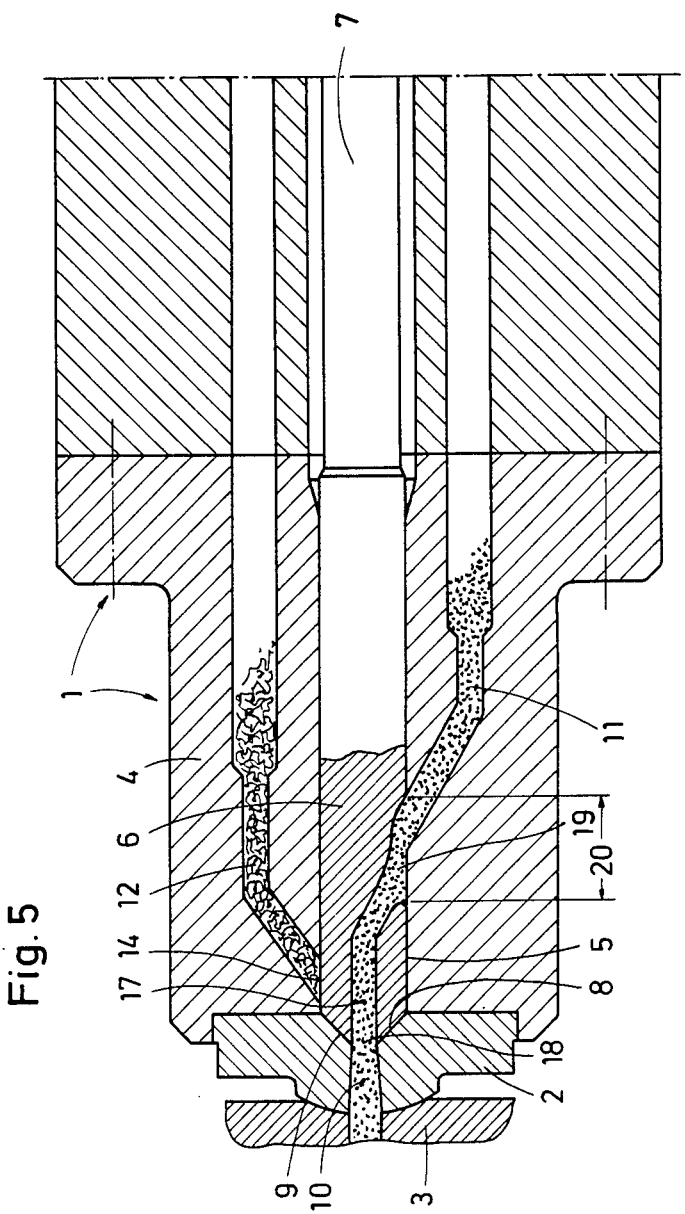

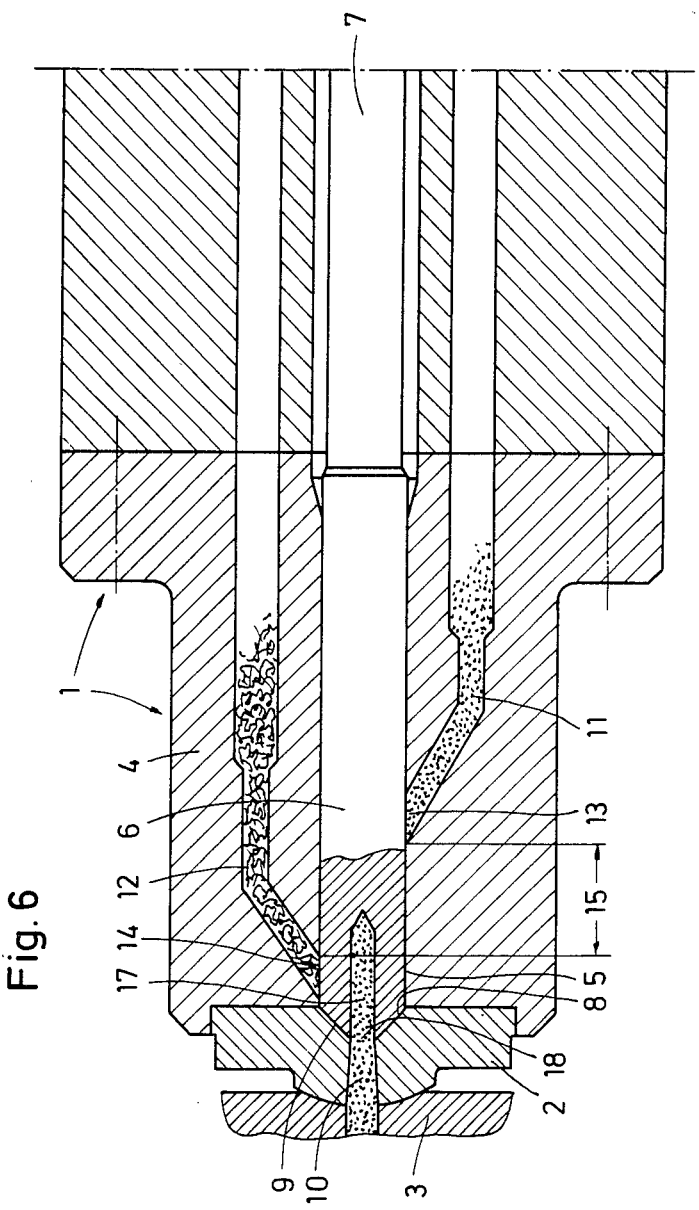

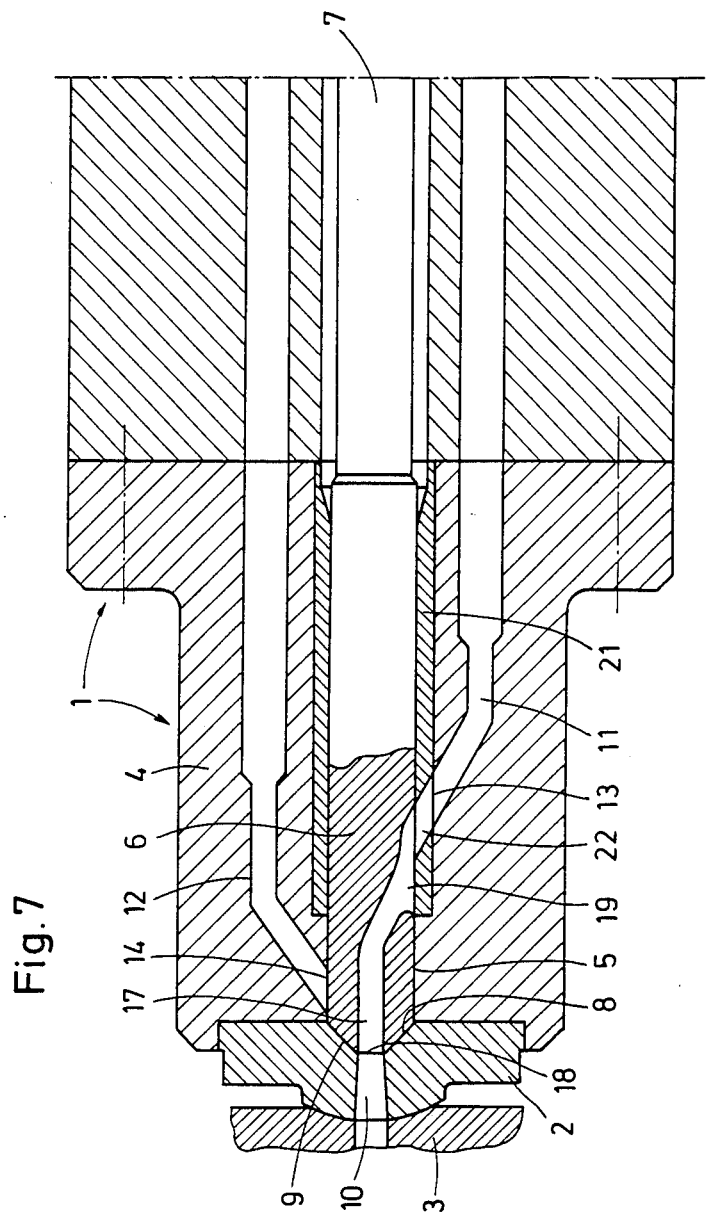

DEVICE FOR MANUFACTURING MOLDED ARTICLES OF PLASTICS MATERIAL

BACKGROUND OF THE INVENTION

1. Field of the Invention

The present invention relates to a device for manufacturing molded articles of plastics material which have an outer skin preferably of a plastics material free of expanding agents and a core, preferably a porous core of plastics material containing an expanding agent. The device includes an extruder head with a main duct in communication with a discharge opening. Two feed ducts for the two plastics materials lead angularly offset into the main duct at locations axially spaced from the discharge opening and from each other. A closing needle is placed axially movable in the main duct. The two feed ducts can be separated from the main duct by means of the closing needle. The closing needle defines a connecting duct extending essentially in axial direction. The connecting duct ends, on the one hand, at the end face of the closing needle and, on the other hand, at the circumference of the closing needle radially toward the more remote feed duct.

2. Description of the Prior Art

An extruder head of the above-described type is already known from German Offenlegungsschrift No. 3,247,000. This extruder head is characterized in that, in the closed position of the closing needle and seen in axial direction from the discharge opening, the connecting duct provided in the closing needle emerges radially from the closing needle in front of the more remote feed duct. This extruder head is additionally characterized in that the distance between the front edge of the inner radial outlet opening of the connecting duct and the free end face of the closing needle is greater than the smallest axial distance between the front edge of the front feed duct and the front edge of the rear duct, on the one hand, and smaller than the greatest axial distance between the front edge of the front feed duct and the rear edge of the rear feed duct, on the other hand.

Compared to other known extruder heads as disclosed, for example, in German Utility Model No. 8,034,352, the extruder head according to German Offenlegungsschrift No. 3,247,000 has the advantage that in an extruder head which is structurally as complicated, it is possible during the injection procedure to effect a continuous transition from one plastics material to the other plastics material and vice-versa, without requiring the use of special locking devices. Moreover, it is possible, if necessary, to inject into a mold a plastics material without expanding agent as well as a plastics material containing an expanding agent separately from each other without the use of special locking devices.

The device of the type described above for manufacturing molded articles from plastics material is deficient in that, when an injection molding procedure is carried out with the plastics material containing an expanding agent, a so-called afterpressure can be exerted on the plastics material already in the mold only if an intermediate stop means is provided in the feed range for the plastics material with an expanding agent, i.e., if the extruder head is operated with a special control in order to achieve sealing.

It has been found that, due to the sluggish movements resulting from this type of control, the reproducibility of the desired result, i.e., sealing, is not always ensured.

Another deficiency of known devices for manufacturing molded particles of plastics material as disclosed, for example, in German patent No. 2,342,789, is that, due to the subsequent injection with plastics material free of expanding agents, the respective closing needle must press the plastics material in front of it into the sprue. While this can be done easily in foamed molded articles having relatively thick walls, this cannot be achieved in molded articles having thin walls because the sprue has usually at this time already hardened.

It is, therefore, the principal object of the present invention to further develop a device for the manufacture of molded articles of plastics material of the above-specified type in such a way that, in a device of inexpensive construction, the subsequent injection with plastics material free of expanding agents is made possible and the main duct can be closed by means of the closing needle in such a way that only small volumes of melt must be moved. In addition, the extruder head is to have optimum rheological properties. Another object is to make it possible to operate plastics material flows having different temperatures and different types of plastics material, for example, plastics material free of expanding agents and plastics material containing an expanding agent.

SUMMARY OF THE INVENTION

In accordance with the present invention, in the closed axial position of the closing needle as well as in at least partially open axial position of the closing needle, the radial circumferential opening of the connecting duct is located approximately on the same level as the inner radial outlet opening of the more remote feed duct. In addition, the closing needle, or its radial circumferential opening, is rotatable about the longitudinal axis of the extruder head relative to the outlet opening in any axial position of the closing needle.

The device according to the present invention has the particular advantage that the supply of plastics material free of expanding agent used for forming the compact outer skin of the molded articles can be interrupted with the aid of the closing needle without the respective plastics material being displaced into the sprue of the mold.

In accordance with another feature of the present invention, the axial width of the radial circumferential opening of the connecting duct at the closing needle is approximately twice the axial width of the outlet opening at the corresponding feed duct.

As a result, the connecting duct remains connected to the corresponding feed duct at least over a portion of the distance of axial displacement of the closing needle. As a result, it is possible simultaneously to feed plastics material containing expanding agent and plastics material free of expanding agent into the mold connected to the extruder head.

The operation of the extruder head according to the present invention is optimized if the angle of rotation of the closing needle in the extruder head is limited. Thus, the connecting duct in the closing needle can be connected to or separated from the corresponding feed duct in a very simple manner.

The extruder head according to the present invention is of particularly simple construction if the radial circumferential opening of the connecting duct is formed directly in the closing needle. However, it may be advantageous in some cases to provide the radial circumferential opening for the connecting duct in a sleeve which is mounted rotatably on the circumference of the closing needle. In this situation, the closing needle itself only has to be moved axially, while the sleeve containing the radial circumferential opening may be seated so as to be rotatable within the housing of the extruder head.

In accordance with another advantageous structural feature of the present invention, the axial distance between the two openings of the two feed ducts into the main duct is approximately twice the axial width of the openings of the feed ducts.

In accordance with another feature of the present invention, the translational and rotational movements of the closing needle are carried out optionally either simultaneously or one after the other. However, it is also possible to couple, or make capable of coupling, the translational and the rotational movements of the closing needle.

Finally, the closing needle may be arranged in the housing of the extruder head so as to be movable only in axial direction, while the sleeve is mounted so as to be rotatable only by a limited angle.

The device according to the present invention can be used as a machine nozzle as well as a nozzle for a hot duct system for a multiple component injection molding process.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIGS. 1 through 7 are longitudinal sectional views of the extruder head according to the present invention, showing the portions of the extruder head which are essential for the present invention in different positions of operation.

DETAILED DESCRIPTION OF THE INVENTION

Figure 1:
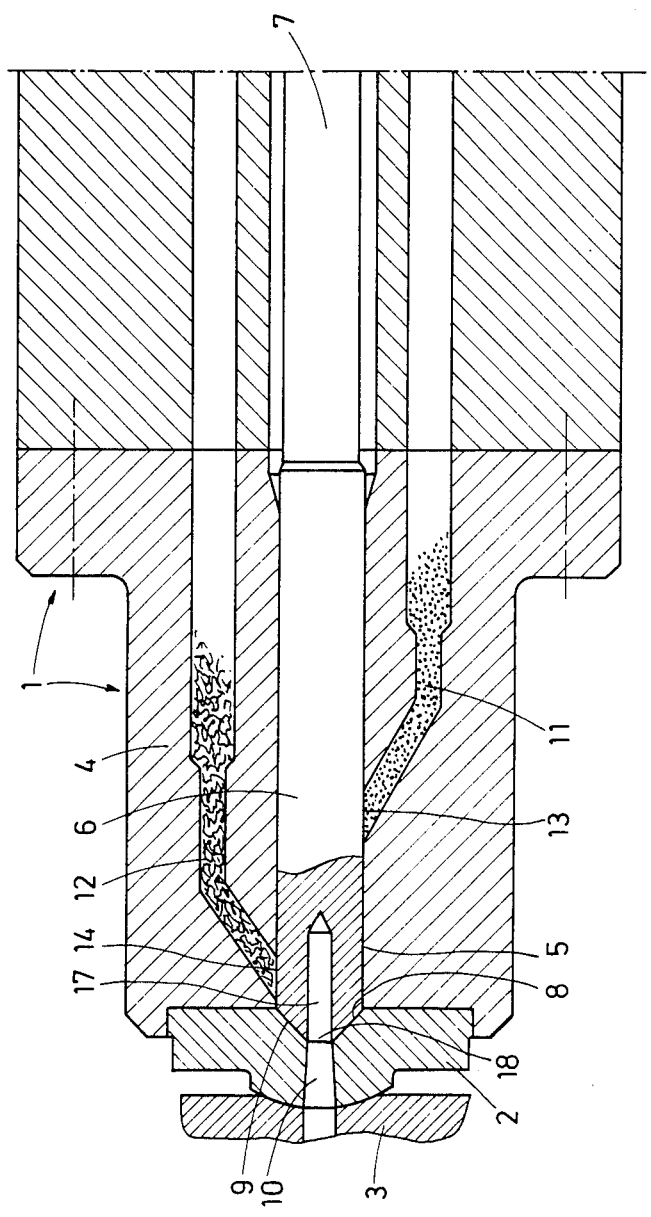

The drawings show of a device for manufacturing molded articles of plastics material having a compact outer skin of plastics material free of expanding agent and a porous core of plastics material containing an expanding agent, only an extruder head 1 which is connected through a nozzle 2 to a sprue bushing 3 of an injection mold, not shown.

A main duct 5 which receives a closing needle 6 extends from the nozzle 2 coaxially through a housing 4 of the extruder head 1. Closing needle 6 includes a shaft 7 extending rearwardly through the extruder head 1. The shaft 7 is engaged by a displacement drive, not shown, which can be actuated, for example, by a pressure medium, particularly a hydraulic medium.

The end of the closing needle 6 defines a sealing cone 8 which interacts with an appropriately shaped sealing cone 9 in nozzle 2 when the closing needle 6 is in the advanced sealing position, as clearly illustrated in FIGS. 1, 5 and 6.

At a distance from nozzle 2 which contains an outlet opening 10 opens a feed duct 11 into main duct 5 of housing 4. At the opening into the main duct 5, the feed duct 11 is inclined at a predetermined angle, for example, of 30° to 40°. The feed duct 11 is connected at its other end leading out of the extruder head 1 to an injection unit, not shown.

At a distance from nozzle 2 which is smaller than the distance of the opening of feed duct 11 into main duct 5 from nozzle 2, another feed duct 12 opens into main at a predetermined angle of, for example, 30° to 40°. This feed duct 12 also preferably extends toward the rear out of extruder head 1 and is connected at this other end to an injection unit, not shown.

Openings 13 and 14 of the two feed ducts 11 and 12 into main duct 5 are preferably located on circumferentially opposite portions of main duct 5 and are axially offset relative to each other by a distance 15 which preferably is twice the size of the axial width of the two openings 13 and 14 of the ducts 11 and 12, respectively.

Figure 2:
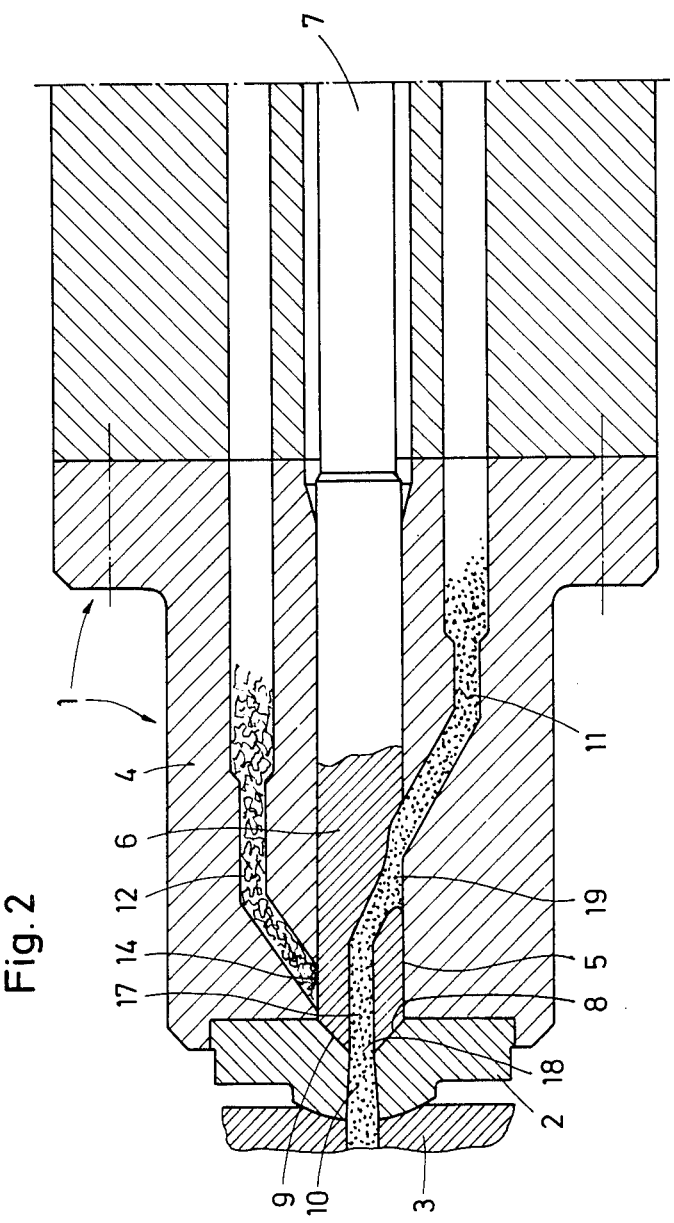
Figure 3:
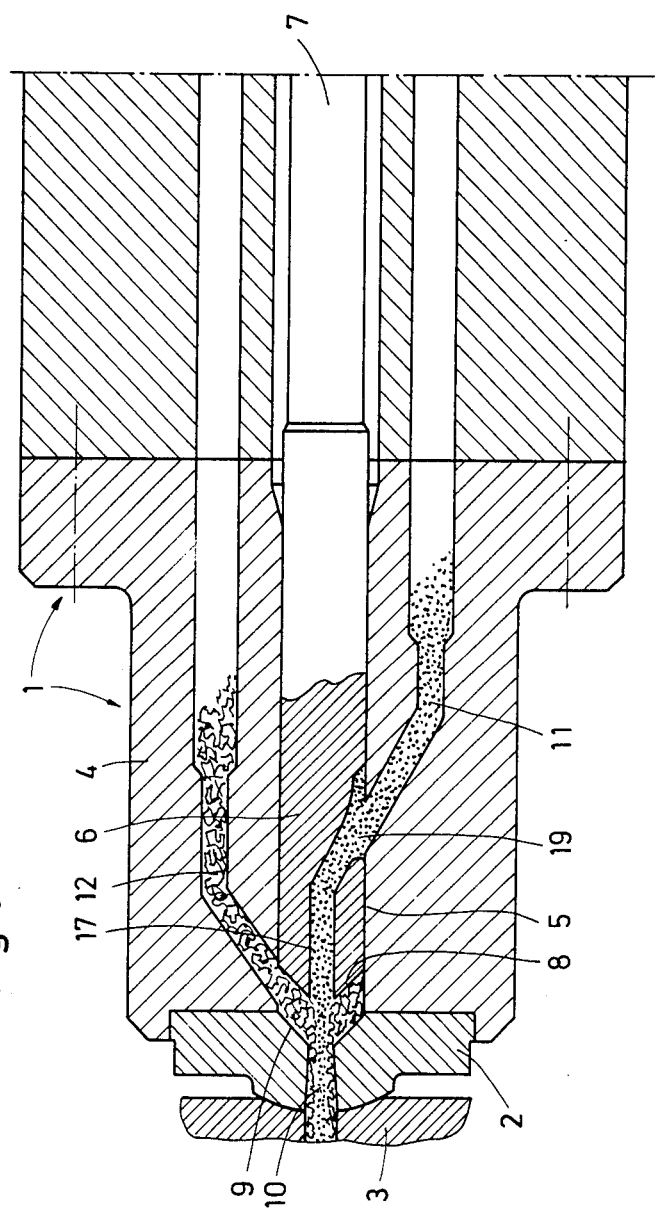

Dimension 16 of the possible axial displacement of the closing needle 6 is selected at least of such a magnitude that the cross-sectional area of the opening 14 of the duct 12 into main duct 5 can be fully closed, as illustrated in FIGS. 1, 2 and 5, 6, while this cross-sectional area may also be almost completely open, as illustrated in FIGS. 3 and 4.

Closing needle 6 defines a connecting duct 17 which extends coaxially to the longitudinal axis of the extruder head. The opening 18 of connecting duct 17 at the free end of closing needle 6 is provided in axial alignment with the discharge opening 10 of nozzle 2.

The other end of the connecting duct 17 extends under a predetermined angle of inclination of, for example, 30° to 40°, radially toward the circumference of closing needle 6 and forms a circumferential opening 19 whose axial width 20 is greater than the axial width of outlet opening 13 at the corresponding feed duct 11. It has been found advantageous if the axial width 20 of the radial circumferential opening 19 is selected approximately twice the axial width of the outlet opening 13 of the duct 11. As a result, it is ensured that the flow can be maintained between the duct 11 and connecting duct 17 even during an axial displacement of closing needle 6, as can be clearly seen from a comparison of FIGS. 2 and 4 of the drawing.

On the other hand, to ensure that the flow connection between the feed duct 11 and the connecting duct 17 can be interrupted at any time, closing needle 6 is not only axially displaceable but also mounted rotatably in housing 4 or main duct 5 of extruder head 1. The angle of possible rotation of the needle 6 can be limited in such a way that, in one angular position, the radial circumferential opening 19 of connecting duct 17 is separated from the outlet opening 13 of feed duct 11, as illustrated in FIGS. 1, 4 and 6, while, in the other angular position, openings 19 and 13 are in communication, as shown in FIGS. 2, 3 and 5.

An angle of rotation of closing needle 6 of, for example, 90° should be sufficient in most cases for effecting and interrupting the flow connection of the feed duct 11 with the connecting duct 17.

In the simplest case, the axial displacement and the angular rotation of closing needle 6 are effected and controlled independently from each other by separate drives. It is then possible, if desired, to carry out the translational and the rotational movements of closing needle 6 either simultaneously or one after the other.

However, it is also easily possible to couple the translational and the rotational movement of the closing needle 6 and to control the movements in a predetermined relationship. For this purpose, it is easily possible to utilize cam drives or crank drives which can be adapted to different requirements.

As illustrated in FIG. 7, it is also possible to provide the closing needle 6 in the housing 4 of extruder head 1 so as to be only axially movable and to provide a sleeve 21 around the closing needle 6 which is mounted in the housing 4 of extruder head 1 in such a way that it is rotatable but axially immovable. The sleeve includes a radial circumferential opening 22 having an axial width 20 which, depending upon its position of rotation, effects or interrupts the flow connection between feed duct 11 and connecting duct 17.

Thus, opening 22 of sleeve 21 can be placed in a position in which it coincides with opening 13 of feed duct 11, as shown in FIG. 7, or opening 22 can be rotated away from opening 13. When the outlet opening 13 coincides with radial opening 22 of sleeve 21, a flow connection to the circumferential opening 19 of the connecting duct 17 is effected, independently of the position of closing needle 6, i.e., the flow connection is effected when the closing needle 6 has been moved in axial direction into the closed basic position, as shown in FIG. 7, or when it has been moved back axially into an opening position, as can be seen in FIG. 3. The circumferential opening 22 may have an axial width in the sleeve which corresponds to the axial width 20, as it is indicated in FIG. 5 with respect to circumferential opening 19 of connecting duct 17.

In the extruder head 1 illustrated in the drawing, feed duct 11 in housing 4 and connecting duct 17 in closing needle 6 serve for feeding the plastics material melt free of expanding agents, while the plastic material melt containing an expanding agent is fed to main duct 5 through feed duct 12.

In the position of operation of the extruder head 1 illustrated in FIG. 1, i.e., in the closed initial position of closing needle 6, the two melt flows are conducted through feed ducts 11 and 12 only to the circumference of closing needle 6. Accordingly, the flows cannot reach either the main duct 5 or the nozzle 2.

In the position of operation illustrated in FIG. 2, the closing needle 6 is still in its advanced closing position. However, closing needle 6 has been turned in circumferential direction, so that outlet opening 13 of feed duct 11 is in communication through radial circumferential opening 19 with connecting duct 17 in closing needle 6. Thus, the plastics material free of expanding agent present in feed duct 11 can reach the mold only through the connecting duct 17 and the discharge opening 10 of nozzle 2.

As soon as a certain amount of plastics material free of expanding agents has reached the mold, closing needle 6 is axially retracted from the position shown in FIG. 2 into the position shown in FIG. 3. As a result, the outlet opening 14 of feed duct 12 into main duct 5 is released and, simultaneously, the opening 18 of connecting duct 17, is pulled into the main duct 5 from the discharge opening 10 of nozzle 2. In this position, plastics material free of expanding agent and plastics material containing an expanding agent are simultaneously fed through main duct 5 into the discharge opening 10 of nozzle 2.

Closing needle 9 is now rotated in its axial position illustrated in FIG. 3 about its longitudinal axis into the initial position, so that the outlet opening 13 of feed duct 11 is no longer in communication with the radial circumferential opening 19 of connecting duct 17. Thus, the supply of plastics material free of expanding agent is interrupted, so that now only plastics material containing an expanding agent is conducted from feed duct 12 into main duct 5 and from main duct 5 through discharge opening 10 of nozzle 2 into the mold.

As soon as the desired or required amount of plastics material containing an expanding agent has been injected into the mold, the closing needle 6 is rotated as well as axially moved from the position according to FIG. 4, so that initially the position of operation according to FIG. 3 and then the position of operation according to FIG. 5 are reached. In the position of operation according to FIG. 5, the plastics material free of expanding agent exerts the necessary afterpressure on the molded article in the mold, so that the space of the mold is filled in the optimum manner. Simultaneously, the plastics material free of expanding agent still in the discharge opening 10 of throttle 2 is flushed out, so that the extruder head is prepared for the next shot.

The closing needle 6 is now rotated into the position according to FIG. 6, so that the position of operation shown in FIG. 1 is again reached.

After the cooling time has elapsed, the mold can be opened and the molded article can be taken out of the mold.

It should be pointed out that the positions of operation illustrated in FIGS. 1 through 6 are not required in all cases. For example, if an operation is carried out in which the nozzle for plastics material free of expanding agent is always open, the extruder head 1 only assumes the positions of operation illustrated in FIGS. 2, 3 and 5 of the drawing.

In molded articles of plastics material having an outer skin and core, preferably a plastics material free of expanding agent is used for the skin which ensures a smooth compact sheathing of the core, while generally a plastics material containing an expanding agent is used for the core in order to obtain a porous structure thereof. However, if it is desired in certain situations, the plastics materials can also be used in the opposite manner or the use of two plastics materials either free of expanding agent or containing an expanding agent is possible.

The present invention is not limited to a device in which only two feed ducts lead into the main duct. It is also possible to use more than two plastics materials if the extruder head and the plastics material are appropriately modified.

While a specific embodiment of the invention has been shown and described in detail to illustrate the application of the inventive principles, it will be understood that the invention may be embodied otherwise without departing from such principles.

I claim:

1. A device for manufacturing molded articles of plastics material having an outer skin and a core, the device including an extruder head defining a discharge opening and a main duct in communication with the discharge opening, the extruder head further defining two feed ducts for the plastics materials of the outer skin and of the core, the two feed ducts leading angularly offset into the main duct at locations axially spaced from the discharge opening and from each other, a closing needle placed axially movable in the main duct, the two feed ducts capable of being separated from the main duct by means of the closing needle, the closing needle having an end face and a circumference and defining a connecting duct extending essentially in axial direction, the connecting duct being at the end face of the closing needle and at the circumference of the closing needle radially toward the feed duct located more remote from the discharge opening, the improvement comprising, in a closed axial position of the closing needle as well as in an at least partially open axial position of the closing needle, the radial circumferential opening of the connecting duct being located approximately on the same level as the inner radial outlet opening of the more remote feed ducts, wherein the closing needle and its radial circumferential opening are rotatable by a limited angle about the longitudinal axis of the extruder head relative to the outlet opening in any axial position of the closing needle.

2. The device according to claim 1, wherein the plastics material for the outer skin is free of expanding agent and the other plastics material contains an expanding agent to form a porous core.

3. The device according to claim 1, wherein the axial width of the radial circumferential opening of the connecting duct at the closing needle is approximately twice the axial width of the outlet opening at the corresponding feed duct.

4. The device according to claim 1, wherein the closing needle is rotatable in the extruder head by a limited angle of rotation.

5. The device according to claim 1, wherein the radial circumferential opening of the connecting duct is formed in the closing needle.

6. The device according to claim 1, comprising a sleeve mounted rotatably on the circumference of the closing needle, the radial circumferential opening of the connecting duct being formed in the sleeve.

7. The device according to claim 1, wherein the axial distance between the two openings of the two feed ducts into the main duct is approximately twice the axial width of the opening of the feed ducts.

8. The device according to claim 1, wherein the closing needle is capable of carrying out translational and rotational movements simultaneously.

9. The device according to claim 1, wherein the closing needle is capable of carrying out translational and rotational movements one after the other.

10. The device according to claim 1, wherein translational and rotational movements of the closing needle are capable of being coupled.

11. The device according to claim 6, wherein the closing needle is capable of being moved only axially, and the sleeve is mounted so as to be rotatable only a limited angle.

* * * * *